3,201,329
CARBONIZING PROCESS AND APPARATUS
Lester C. Burt, El Paso, Tex., assignor to Burt and Redman, El Paso, Tex., a partnership of Texas
Filed June 10, 1963, Ser. No. 288,584
8 Claims. (Cl. 202—6)

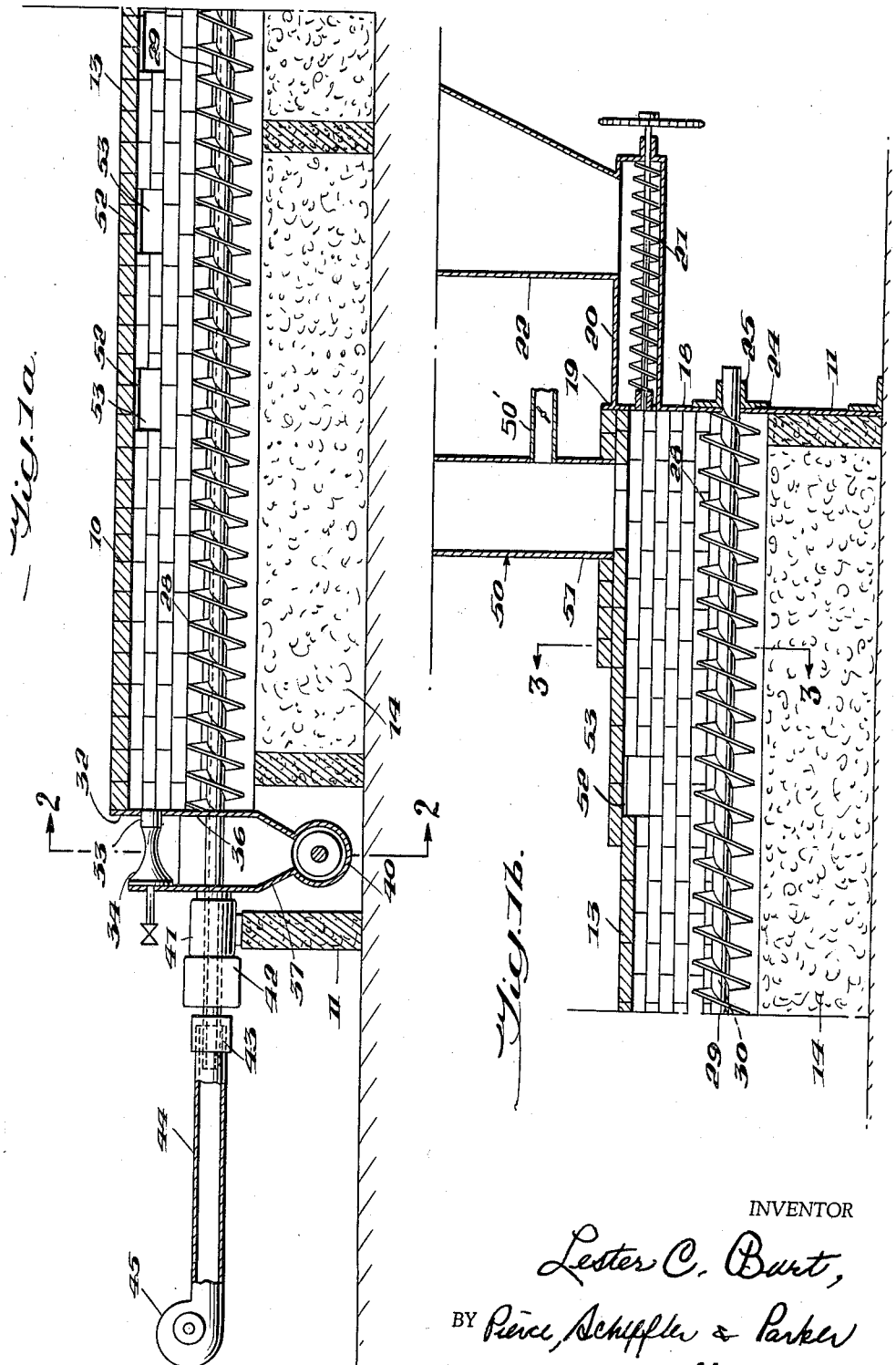

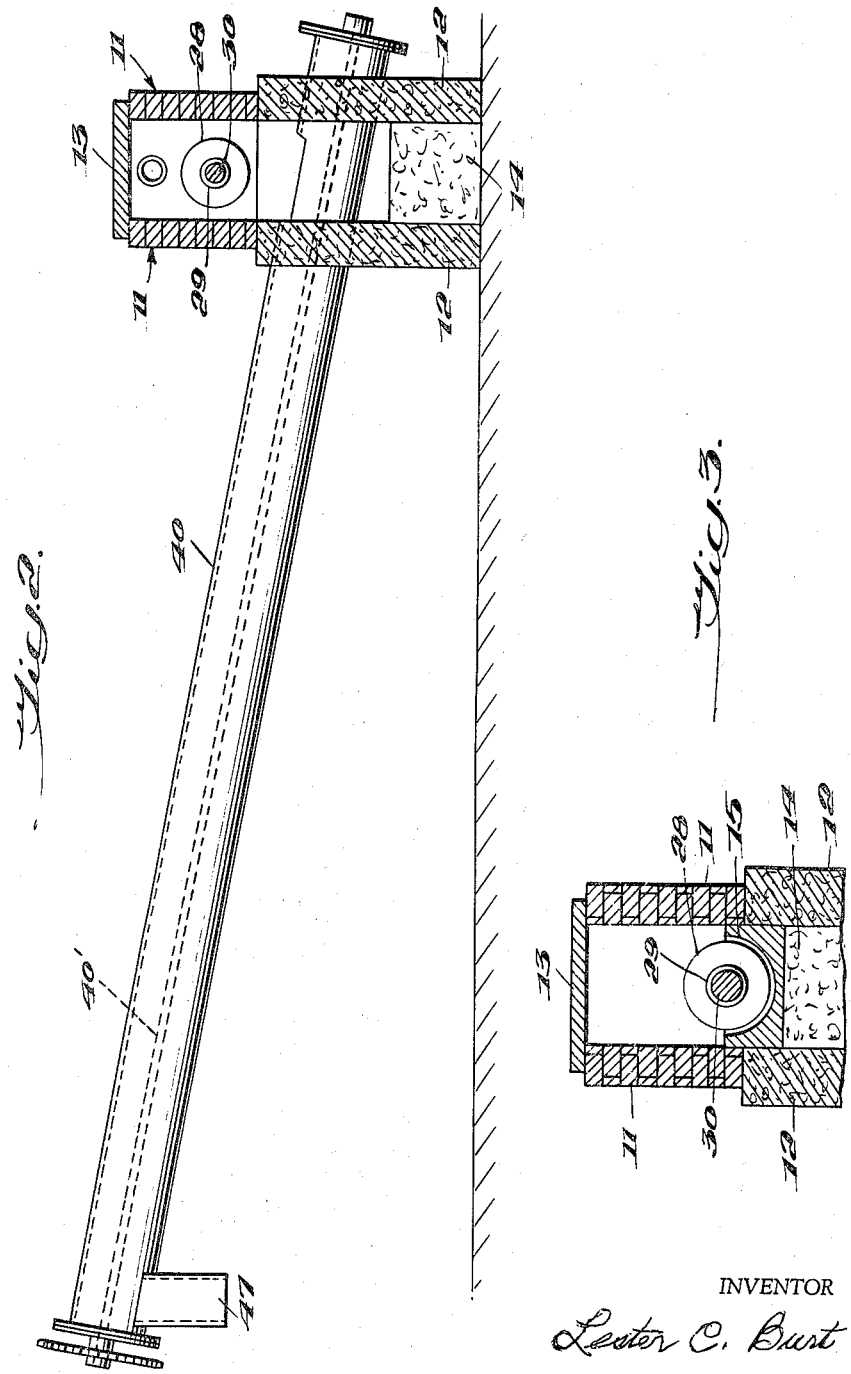

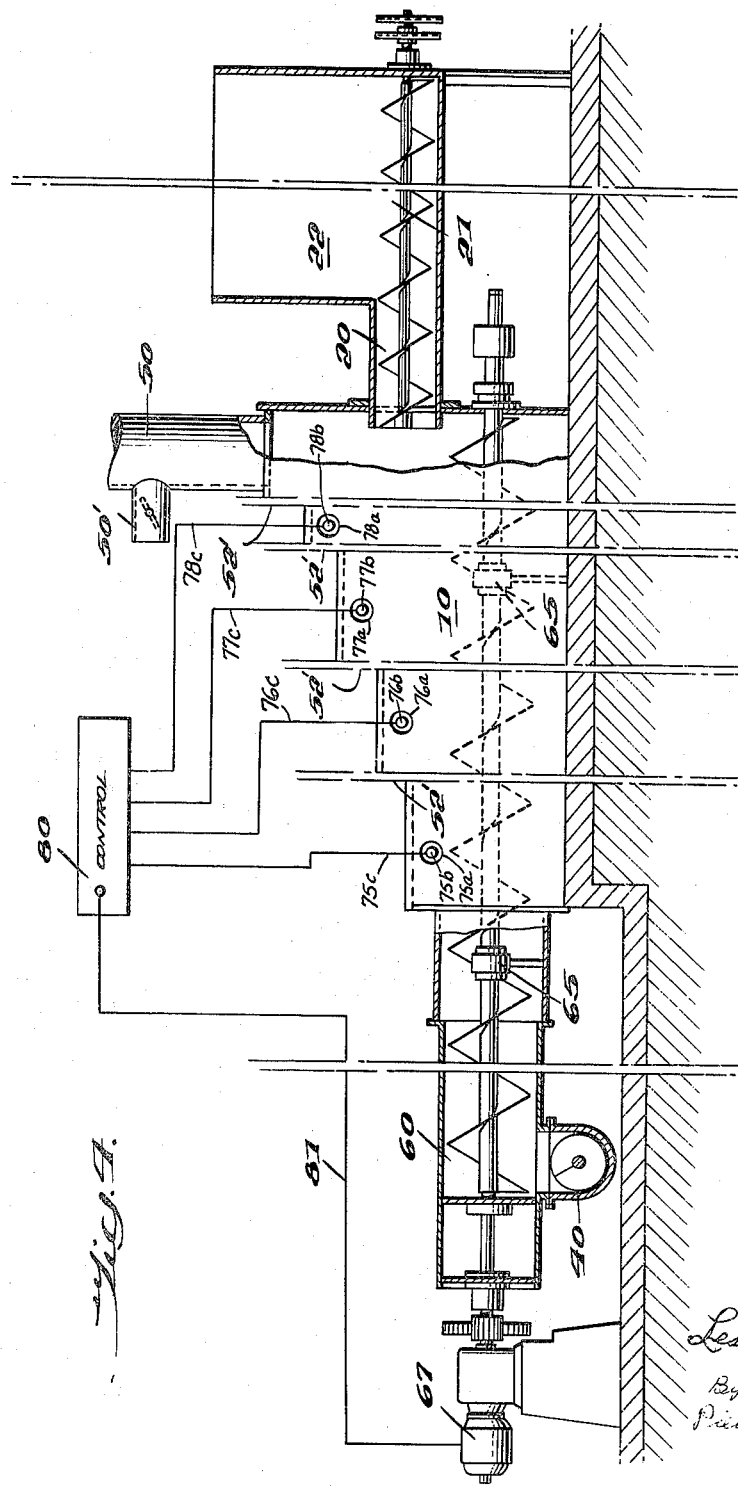

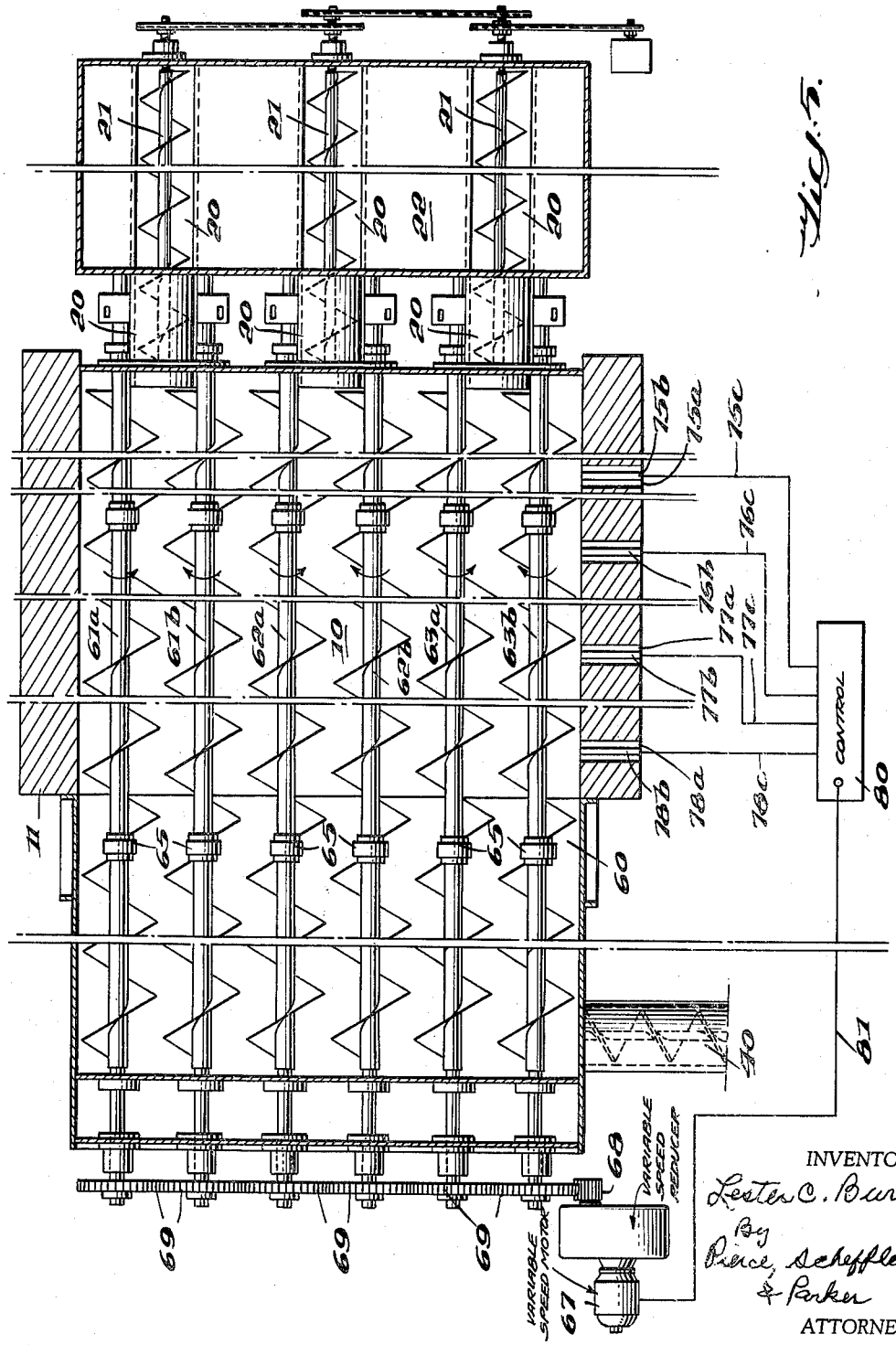

The application contains subject matter in common with my co-pending application Serial No. 124,185 filed July 14, 1961, and is a continuation-in-part of the latter. Application Serial No. 124,185 became abandoned subsequent to the filling of the present application.

This invention relates to the transformation of carbonaceous vegetable matter into charcoal, and is concerned with an improved process, and improved apparatus, for effecting such transformation.

An object of the invention is the provision of a completely regenerative process of converting carbonaceous vegetable matter into the charcoal. Another inventive object is to provide a carbonizing apparatus which is simple in design and construction, highly efficient in operation and comparatively free from maintenance troubles.

According to the present invention, waste vegetable matter (e.g., sawdust, slab wood, nut shells, wood chips and the like) is continuously fed into, and moved through, an initially preheated, elongated, generally horizontal tunnel-like roasting chamber having a generally trough-like bottom of heat-refractory material, in which trough a main screw conveyor means is disposed for forward movement of the feed through the chamber.

The side walls and roof or ceiling of the roasting chamber or tunnel are formed of heat-refractory material such as firebrick, and for a part of the distance therealong the sidewalls are provided with spaced closable air inlet ports. A chimney or stack of substantial size and height is operatively associated with the interior of the roasting chamber adjacent the feed inlet end of the latter, which stack is provided for exhausting gaseous products of combustion from the carbonizing vegetable matter being heated therein to a temperature at which its gaseous and readily gasifiable components are vaporized into a tunnel atmosphere containing a regulated amount of oxygen just sufficient to combust these gases.

At the end of the roasting tunnel remote from the inlet end thereof the aforesaid main screw conveyor means discharges into a confined hopper the lower portion of which constitutes a lower inlet section of a transversely arranged, upwardly inclined tubular discharge channel housing a secondary screw conveyor. The tubular discharge channel is of substantial length and has a sufficient inclination that its discharge end is at a level higher than the discharge end of the main screw conveyor means of the roasting tunnel: consequently, during operation of the apparatus the discharge channel is completely filled—save for said secondary screw conveyor—with hot charcoal thereby "plugging" the channel against the intake of outside air.

As will be readily appreciated by one skilled in this art, the objective is to burn off volatile matter from the waste vegetable material so that only charcoal will remain. To this end the roasting tunnel is initially preheated, in any suitable manner, to an interior temperature at which vaporization and combustion of the volatiles will occur, and sufficient air inlet ports in the inlet end of the roasting tunnel are opened to allow the intake of enough, and only enough, air to furnish the oxygen necessary for the complete combustion of said volatiles. Consequently, no air is admitted into that portion of the roasting tunnel (i.e., approximately the final third of its length) wherein no further volatilization of gasifiable components (of the waste vegetable material) occurs. The combustion of the volatiles maintains the interior of the roasting tunnel at well above ignition temperature, so that no heat from an extraneous source is required save for the initial preheating operation when the roasting tunnel is put into service after a shut-down.

Because of the high temperature obtaining in said roasting tunnel, the main screw conveyor means is made hollow and is associated with suitable cooling means.

Appurtenances to the above-described apparatus are: a hopper means to contain a supply of the waste vegetable material to be carbonized; a feeding means for moving a continuous stream of such vegetable material from said hopper means to and into the inlet end of said roasting tunnel; suitable bearing means for rotatably supporting said main screw conveyor means in cooperating relationship with respect to the trough-like bottom of said tunnel; and means for forcing a current of gaseous coolant (e.g., air) counter-currently through the hollow main screw conveyor means. Preferably, there also are provided means for cooling the secondary screw conveyor.

It is to be noted that the apparatus above generally described may include a single main screw conveyor and a correspondingly narrow carbonizing chamber for housing it; or, the apparatus may include a plurality of generally parallelly disposed main screw conveyors and a correspondingly widened carbonizing chamber.

Optional appurtenances of the above-described apparatus include a variable speed drive for the main screw conveyor means and means for sensing the intensity or/ and the distribution of the flames (of burning volatile matter) and for varying the drive speed in accordance with the findings of said sensing means.

The invention will now be described in greater particularity and with reference to the accompanying drawing, in which FIGURE 1 is a vertical sectional view through a carbonizing apparatus embodying concepts of the present invention;

FIGURE 2 is a vertical transverse sectional view taken on line 2—2 of FIGURE 1;

FIGURE 3 is a vertical transverse sectional view taken on line 3—3 of FIGURE 1;

FIGURE 4 is a vertical sectional view through a multi-unit carbonizing apparatus embodying concepts of this invention; and FIGURE 5 is a plan view of the apparatus shown in FIGURE 4.

The roasting tunnel is represented generally at 10. As is shown more particularly in FIG. 2, the roasting tunnel is formed of longitudinal side walls 11, 11, constructed of firebrick, on suitable foundation walls 12, 12, and a flat roof 13 of refractory slabs. The space between foundation walls 12, 12 is filled with sand 14. Preferably, and as shown in the drawing, the sand fill 14 is topped by a U-shaped pre-formed trough 15 of refractory material. Alternatively, the trough 15 may be omitted and the sand fill continued to desired height.

At one (the inlet) end, tunnel 10 is closed by an end wall 18 which is pierced by two generally circular openings 19 and 24. Opening 19 accommodates feed tube 20, containing feed conveyor screw 21. An open-bottomed feed hopper 22 is disposed above, and in cooperating relationship with the interior of tube 20, for containing a supply of the waste vegetable matter to be carbonized and delivering the same in a continuous stream to feed conveyor screw 21 for introduction into the roasting tunnel.

Opening 24 in end wall 18 accommodates a bearing member 25 for rotatably supporting one end (the inlet end) of main screw conveyor 28. Screw conveyor 28 extends the full length of roasting tunnel 10 and is disposed in the U-shaped trough 15. As is indicated in the drawing, the shaft 29 of screw conveyor 28 is a hollow center 30.

At its outlet end tunnel 10 is closed by end wall 32, which is pierced by a circular opening 33 for the accommodation therein of a burner 34 of conventional type. End wall 32 is pierced also by a circular opening 36 for accommodation of the outlet end of main screw conveyor 28. At its lower end, wall 32 constitutes one side wall of a confined hopper member 37 the main portion of which latter depends beneath the outlet end of tunnel 10 for gravitational delivery of carbonized material to inclined tubular discharge channel 40.

Shaft 29 extends through hopper member 37, and is rotatably supported by conventional bearing means represented generally at 41, 42. A gland 43 of conventional design couples an air duct 44 to the hollow interior 30 of rotating shaft 29. A conventional source of air under superatmospheric pressure, e.g., a blower, is represented at 45, duct 44 leading from the discharge outlet of blower 45.

Inclined channel 40 terminates, at its upper (discharge) end, in a discharge orifice 47.

Channel 40 houses a secondary screw conveyor 40' which extends the full length of channel 40. Channel 40 may, if desired, be cooled by any conventional mode of cooling, e.g., by a series of water sprays discharging against the outer surface of channel 40, or by a series of water sprays discharging into the interior of channel 40, or by circulating a cooling liquid through a hollow core (not shown) provided in the shaft of screw conveyor 40'. Charcoal discharged at 47 may be caught in any suitable receptacle (not shown).

Adjacent the inlet end of roasting tunnel 10 there is provided a vertical stack 50, of substantial cross-section, accommodated in an orifice 51 in roof 13. A dampered tempering air duct 50' for air inlet and draft control preferably is provided for stack 50, as indicated in FIG. 1.

For admitting combustion air into the interior of roasting tunnel 10 there are provided, in walls 11, spaced openings 52 closable by loose firebrick 53.

In an actual embodiment of the apparatus aspect of the invention, the roasting tunnel had an inner width of about 13 inches, and a height varying between 26 inches at the discharge end and 38 inches at the feed end, and an overall length of about 22 feet.

In use, the apparatus is prepared for operation by preliminarily heating the interior of the roasting tunnel 10 to from about 1100° to about 1500° F. (within which range volatilization of volatilizable components of the feed becomes reasonably rapid) by means of burner 34. It should be noted, here, that once the interior is so preheated and carbonization has been initiated, operation of burner 34 is discontinued, and the burner might, if the same seems desirable, be physically removed and orifice 33 closed by any suitable closure.

The preheating having been effected, the feed—consisting, say, of sawdust having an average moisture content of 10%—is continuously delivered by feed tube 20 into the inlet end of tunnel 10, and is moved forward through the latter by means of main screw conveyor 28, at the feed rate of about 2000 pounds per hour, this forward movement being effected by rotating the conveyor at the approximate rate of 5 peripheral feet per minute. Atmospheric air is forced countercurrently through the hollow center 30 of the main screw conveyor shaft in an amount to maintain the screw conveyor at a tolerable temperature, e.g., 800° F. or below, notwithstanding the fact that temperatures of upward from 1500° F. obtain in the tunnel.

Appreciable volatilization of volatilizable (combustible) components of the feed material is discernible by the time the feed material had advanced approximately 3 feet into the tunnel these volatile components tending to be drawn countercurrently to the advancing feed material toward stack 50. Atmospheric air is admitted, at ports 52, 52, in a controlled amount just sufficient to combust the volatilizable components. At this point when there remains only glowing embers (i.e., charcoal) and there is no flame (as determined by visual inspection) volatilization is complete. This takes place about 16 feet from the feed end of the tunnel.

By the time the feed material had been advanced to confined hopper 37 substantially all volatilizable components will have been driven off and the feed material reduced to charcoal. The charcoal is moved into hopper 37 at the rate of approximately 500 pounds per hour, and at an average temperature of 700–800° F.

Charcoal is moved from hopper 37 by means of channel 40 containing conveyor 40' at the same rate it was delivered thereinto, and is discharged at its upper end at an average temperature of 400° F., at which latter temperature the charcoal is safe from spontaneous combustion.

Air is prevented from entering tunnel 10 from discharge chute 47 because screw 40' inside channel 40 is inclined and therefore must run full to convey.

During the operation of the carbonizing apparatus, the interior portion nearest the feed end is an inferno of flames from the burning volatiles. The material being carbonized is covered with an envelope of flame. Since the material is becoming carbonized as the volatiles are driven off tends to ride along the bottom part of the main screw conveyor, the envelope of flame insulates the carbon against oxygen so that it is not consumed. Air cannot penetrate the envelope of flames to reach the carbon. As the material becomes carbonized, the intensity of the flame diminishes since fewer volatiles are available to provide burning. Therefore, toward the discharge end exterior air is excluded since the carbon no longer has its envelope of flame to protect it from oxygen. Outside air which had been admitted near the feed end to provide for combustion of volatile matter cannot reach the carbon since the stack draws this air toward it.

The utilization and control of a direct flame to roast volatile matter from carbonaceous material are unique with this invention. Only by employing the components exactly as described in this invention can a direct flame be utilized to produce charcoal autogenously.

The roaster chamber or tunnel may be widened to accommodate as many main and feed screw conveyors as are necessary to roast carbonaceous material available. The roaster can be designed to fit any production requirements for the output of charcoal.

For multiple screw installations employing a large number of screw conveyors, a suspended arch roof may be employed to form the refractory ceiling. For smaller installations, a roof of cast refractory slabs may, as noted above, be used.

More than one multiple screw installation can be tied into a single stack. By doing this, one bank of multiple screws can be shut down for repairs while the other banks are operating. This aspect of the invention is illustrated in FIGURES 4 and 5, in which three "double screw" units constitute the main screw conveyor means of the invention. In this embodiment to the roasting tunnel there is appended an elongation 60 which latter leads to and is disposed in discharging relation to inclined tubular discharge channel 40. Three pairs of material-advancing screw conveyors 61a and 61b, 62a and 62b, 63a and 63b extend through tunnel 10 and elongation 60, these screw-conveyors being suitably supported, intermediate their ends by conventional bearing-provided support members 65, 65 as indicated in FIG. 4. In each pair of material-advancing screw conveyors, e.g., 61a and 61b the direction of rotation (as shown by arrows in FIG. 5) is arranged so that the two rotate toward each other as a unit, and to serve each pair one feed tube 20 and feed conveyor screw 21 are provided. The three pairs of material-advancing screw conveyors are rotated by variable speed (electric) motor 67, drive pinion 68 and a conventional gear train 69, 69.

For close control of the carbonizing operation a plurality of spaced ports 75a, 76a, 77a, 78a are disposed in the side wall 11 of tunnel 10 and in these ports there are fitted flame intensity-sensing means 75b, 76b, 77b, 78b which feed their information to a control device 80 by a series of electrical conductors 75c, 76c, 77c, 78c. A conductor 81, in turn, communicates between control device 80 and variable speed motor 67 for varying the speed of said motor in accordance with the findings of the flame intensity-sensing means 75b, 76b, 77b, 78b.

If complete carbonization has not been effected early enough, the sensing means 78b senses the presence of flames relatively near the discharge end of the tunnel, and the control device 80 signals the variable speed motor 67 to decrease its speed, whereby to slow down the rate of advance of the carbonizing material through the tunnel. Conversely, when carbonization is taking place too rapidly the flames will have died down by the time the material reaches a point opposite sensing means 76b, whereupon the signal from said sensing means to control device 80 automatically results in increasing the speed of motor 67 and, hence, increasing the rate of progress of the carbonizing material through the tunnel.

By the above instrumentation and control optimum rate of movement of the material and optimum conditions of carbonization can be maintained with full utilization of the latent capacity of the apparatus.

In the embodiment illustrated in FIGS. 4 and 5 the spaced openings 52', 52' for admission of combustion air into roasting tunnel 10 are associated with conventional stoppering means (not shown) for adjusting the size of the opening between entirely closed and fully open.

As will readily be appreciated, one, two, three (as illustrated) or more units—each comprising a pair of cooperating material-advancing screw conveyors served by a feed conveyor—may be constructed, to meet the local capacity demands. Thus, while FIG. 5 specifically illustrates a three-unit installation, I have found it convenient, under specific field conditions, to construct and operate a one-unit apparatus.

I claim:

1. In the process of carbonizing waste carbonaceous vegetable matter comprising relatively readily volatilizable combustible constituents whereby to produce a charcoal product, in which process the vegetable matter is heated in an elongated generally horizontal heating zone to the volatilization temperature of said volatilizable constituents and the resulting vapors are burned, the improvement by which the process is made fully self-regenerative as to heat requirements by volatilizing said volatilizable constituents directly into an atmosphere containing enough and only enough free oxygen to effect complete combustion of said volatilized constituents by moving the vegetable matter through the heating zone in countercurrent direct contact with a moving current of burning volatilized components of said vegetable matter in an atmosphere containing oxygen in a lesser ratio than does atmospheric air whereby said readily volatilizable combustible constituents are volatilized and thereupon are burned in direct contact with said vegetable matter to provide all of the heat used in carbonizing said vegetable matter and excluding air from that portion of the heating zone wherein no further volatilization of readily volatilizable combustible constituents occurs.

2. Apparatus for carbonizing waste vegetable matter containing relatively readily volatilizable combustible components, which comprises an elongated generally horizontal roasting tunnel having side walls and roof and floor of refractory material, the floor of said roasting tunnel having formed therein at least one generally U-shaped trough from end to end of said tunnel, and heat-resistant inlet and outlet end walls; at least one main screw conveyor extending through said tunnel and being disposed in said trough, said main screw conveyor including a hollow shaft; means for forcing a coolant fluid through said hollow shaft; a stack operatively associated with said tunnel adjacent the inlet end of the latter; a feed hopper for a supply of raw waste vegetable matter; a feed-conveying means for conveying a continuous stream of such vegetable matter from said feed hopper to and through said inlet end wall and into the inlet end of said tunnel for discharging raw feed onto the flight of said main screw conveyor; adjustable air inlet means spaced along at least a portion of said tunnel for admitting a controlled limited amount of combustion air into said tunnel; a confined hopper member at the outlet end of said tunnel; a discharge orifice in the outlet end wall of said tunnel said orifice providing communication between the interior of said tunnel and said confined hopper member for receiving a continuous stream of solid carbonaceous residues from said tunnel; an elongated generally tubular discharge channel in communication adjacent one end thereof, with said confined hopper member, said channel extending upwardly from said confined hopper member at a sufficient inclination with respect to its length that the end thereof which is remote from said hopper member is at a level above said main screw conveyor; a secondary rotary screw conveyor in and operatively associated with said channel; and means for rotating said main and said secondary screw conveyors.

3. The carbonizing apparatus defined in claim 2, further characterized in that infeed or raw feed from said feed hopper to and into said tunnel is effected by means of a screw conveyor operatively disposed in an inlet tube.

4. The carbonizing apparatus defined in claim 2, in which said tubular discharge channel is disposed generally transversely to the tunnel and in which the lower end of said channel is integrated into a lower portion of said confined hopper member.

5. The carbonizing apparatus defined in claim 2, in which said adjustable air inlet means consists essentially of (a) a plurality of openings spaced for atmospheric air along a substantial part of the length of said tunnel including the inlet portion of the latter, said openings being let into the side wall adjacent the roof of the tunnel, and (b) a plurality of refractory stopper means for closing any desired number of said openings.

6. The carbonizing apparatus defined in claim 2, characterized by at least one material-forwarding unit consisting of a pair of main screw conveyors served by a feed-conveying means.

7. The carbonizing apparatus defined in claim 6, further characterized in that the roasting tunnel contains a plurality of material-forwarding units.

8. The carbonizing apparatus defined in claim 2, in which the main screw conveyor is driven by a variable speed motor and in which a plurality of spaced flame intensity-sensing means are disposed along the roasting tunnel, signals from said sensing means being conducted to a control device which varies the speed of said motor in accordance with such signals.

References Cited by the Examiner

UNITED STATES PATENTS

| 1,429,578 | 9/22 | Galusha | 202—91 |
|---|---|---|---|
| 2,162,991 | 6/39 | Anderson | 202—19 |
| 2,209,255 | 7/40 | Andersen et al. | 202—117 |

MORRIS O. WOLK, *Primary Examiner.*